(12) United States Patent
Courtiol et al.

(10) Patent No.: US 12,118,721 B2
(45) Date of Patent: Oct. 15, 2024

(54) SYSTEMS AND METHODS FOR IMAGE PREPROCESSING

(71) Applicants: Owkin Inc., New York, NY (US); Owkin France SAS, Paris (FR)

(72) Inventors: Pierre Courtiol, Paris (FR); Olivier Moindrot, Paris (FR); Charles Maussion, Paris (FR); Charlie Saillard, Paris (FR); Benoit Schmauch, Paris (FR); Gilles Wainrib, Pantin (FR)

(73) Assignees: OWKIN, INC., New York, NY (US); OWKIN FRANCE SAS, Paris (FR)

( * ) Notice: Subject to any disclaimer, the term of this patent is extended or adjusted under 35 U.S.C. 154(b) by 3 days.

(21) Appl. No.: 18/100,543

(22) Filed: Jan. 23, 2023

(65) Prior Publication Data

US 2023/0386024 A1 Nov. 30, 2023

Related U.S. Application Data

(63) Continuation of application No. 17/183,329, filed on Feb. 23, 2021, now Pat. No. 11,562,585, which is a (Continued)

(30) Foreign Application Priority Data

Jun. 25, 2019 (EP) ..................................... 19305840

(51) Int. Cl.
*G06T 7/00* (2017.01)
*G06F 18/21* (2023.01)
(Continued)

(52) U.S. Cl.
CPC .......... *G06T 7/0012* (2013.01); *G06F 18/214* (2023.01); *G06F 18/2163* (2023.01);
(Continued)

(58) Field of Classification Search
CPC ......... G06T 7/0012; G06T 7/11; G06T 7/194; G06T 2207/10056; G06T 2207/20081;
(Continued)

(56) References Cited

U.S. PATENT DOCUMENTS 11,544,851 B2 * 1/2023 Wainrib ..................... G06T 7/11
11,562,585 B2 * 1/2023 Courtiol ................. G06V 10/50
(Continued)

FOREIGN PATENT DOCUMENTS

WO  WO-2018/45269   A1   3/2018
WO  WO-2018/232388  A1   12/2018
WO     2019108888   A1   6/2019

OTHER PUBLICATIONS

Giorgia Cantisani: "Transfer Learning and Data Augmentation for semantic Segmentation in Histopathology." Jul. 5, 2018, pp. 1-135 XP055717345. Retrieved from https://webthesis.biblio.polito.it/7964/1/tesi.pdf Chapter 2. "Deep Learning and Semantic Segmentation," Section 3.3. "Camelyon 2016". Chapter 4. "Methods and Experimental Set-up."

(Continued)

*Primary Examiner* — Jon Chang
(74) *Attorney, Agent, or Firm* — MARSHALL, GERSTEIN & BORUN LLP

(57) ABSTRACT

A method and apparatus of a device that classifies an image is described. In an exemplary embodiment, the device segments the image into a region of interest that includes information useful for classification and a background region by applying a first convolutional neural network. In addition, the device tiles the region of interest into a set of tiles. For each tile, the device extracts a feature vector of that tile by applying a second convolutional neural network, where the features of the feature vectors represent local descriptors of the tile. Furthermore, the device processes the (Continued)

extracted feature vectors of the set of tiles to classify the image.

20 Claims, 11 Drawing Sheets

Related U.S. Application Data continuation of application No. PCT/IB2020/056037, filed on Jun. 25, 2020.

(51) Int. Cl.
| | |
|---|---|
| *G06F 18/214* | (2023.01) |
| *G06F 18/23* | (2023.01) |
| *G06F 18/2413* | (2023.01) |
| *G06N 3/04* | (2023.01) |
| *G06T 7/11* | (2017.01) |
| *G06T 7/194* | (2017.01) |
| *G06V 10/32* | (2022.01) |
| *G06V 10/50* | (2022.01) |
| *G06V 10/764* | (2022.01) |
| *G06V 10/82* | (2022.01) |
| *G06V 20/69* | (2022.01) |

(52) U.S. Cl.
CPC ........... *G06F 18/217* (2023.01); *G06F 18/23* (2023.01); *G06F 18/2413* (2023.01); *G06N 3/04* (2013.01); *G06T 7/11* (2017.01); *G06T 7/194* (2017.01); *G06V 10/32* (2022.01); *G06V 10/50* (2022.01); *G06V 10/764* (2022.01); *G06V 10/82* (2022.01); *G06V 20/695* (2022.01); *G06V 20/698* (2022.01); *G06T 2207/10056* (2013.01); *G06T 2207/20081* (2013.01); *G06T 2207/20084* (2013.01); *G06T 2207/30024* (2013.01)

(58) Field of Classification Search
CPC ........... G06T 2207/20084; G06T 2207/30024; G06V 10/32; G06V 10/50; G06V 10/764; G06V 10/82; G06V 20/695; G06V 20/698; G06F 18/214; G06F 18/2163; G06F 18/217; G06F 18/23; G06F 18/2413; G06N 3/04
See application file for complete search history.

(56) References Cited

U.S. PATENT DOCUMENTS

| | | | |
|---|---|---|---|
| 2019/0156159 A1* | 5/2019 | Kopparapu | ....... G06F 18/24147 |
| 2020/0066407 A1 | 2/2020 | Stumpe | |
| 2020/0349707 A1 | 11/2020 | Hosseini et al. | |
| 2020/0372635 A1* | 11/2020 | Veidman | ................. G06N 3/08 |
| 2020/0388029 A1 | 12/2020 | Saltz | |

OTHER PUBLICATIONS

ISRWO in appl No. PCT/IB2020/056037 mailed Sep. 11, 2020.
"International Preliminary Report on Patentability," for PCT/IB2020/056037 mailed Dec. 28, 2021 (14 pages).
Intention to Grant received for European Application No. 20743831.8, mailed on Jul. 3, 2023, 6 pages.

* cited by examiner

SYSTEMS AND METHODS FOR IMAGE PREPROCESSING

RELATED APPLICATIONS

This application is a continuation of co-pending U.S. patent application Ser. No. 17/183,329, filed on Feb. 23, 2021, now issued as U.S. Pat. No. 11,562,585, which is a continuation of International Application No. PCT/IB2020/056037, filed on Jun. 25, 2020, which claims the benefit of priority to European Patent Application Number EP19305840.1, filed on Jun. 25, 2019, and the entire contents of the foregoing applications are hereby incorporated herein by reference.

BACKGROUND

Histopathological image analysis (HIA) is a critical element of diagnosis in many areas of medicine, and especially in oncology, where this type of image analysis currently defines a gold standard metric. Recent works have sought to leverage modern developments in machine learning (ML) to aid pathologists in disease detection tasks, but the majority of these techniques require localized annotation masks as training data. These localized annotations are even more costly to obtain than the original diagnosis, because pathologists must spend time to assemble pixel-by-pixel segmentation maps of diseased tissue at extreme resolution. Thus, HIA datasets with annotations are very limited in size. Additionally, such localized annotations may not be available when facing new problems in HIA, such as new disease subtype classification, prognosis estimation, or drug response prediction. The critical question for HIA is: can one design a learning architecture which achieves accurate classification without localized annotation? A successful technique should be able train algorithms to assist pathologists during analysis and could also be used to identify previously unknown structures and regions of interest.

Indeed, while histopathology is the gold standard diagnostic in oncology and other disorders, it is extremely costly, requiring many hours of focus from pathologists to make a single diagnosis. Additionally, as correct diagnosis for certain diseases requires pathologists to identify a few cells out of millions, these tasks are akin to "finding a needle in a haystack." Hard numbers on diagnostic error rates in histopathology are difficult to obtain, being dependent upon the disease and tissue in question as well as self-reporting by pathologists of diagnostic errors. However, false negatives in cancer diagnosis can lead not only to catastrophic consequences for the patient, but also to incredible financial risk to the pathologist. Any tool which can aid pathologists to focus their attention and effort to the most suspect regions can help reduce false-negatives and improve patient outcomes through more accurate diagnoses. Medical researchers have looked to computer-aided diagnosis for decades, but the lack of computational resources and data have prevented widespread implementation and usage of such tools. Since the advent of automated digital whole slide image (WSI) capture in the 1990s, researchers have sought approaches for easing the pathologist's workload and improving patient outcomes through image processing algorithms. Rather than predicting final diagnosis, many of these procedures focused instead on segmentation, either for cell-counting, or for the detection of suspect regions in the WSI. Historical methods have focused on the use of hand-crafted texture or morphological features used in conjunction with unsupervised techniques such as K-means clustering or other dimensionality reduction techniques prior to classification via k-Nearest Neighbor or a support vector machine.

Over the past decade, fruitful developments in deep learning have led to an explosion of research into the automation of image processing tasks. While the application of such advanced machine learning (ML) techniques to image tasks has been successful for many consumer applications, the adoption of such approaches within the field of medical imaging has been more gradual. However, these techniques demonstrate remarkable promise in the field of HIA. Specifically, in digital pathology with WSI, highly trained and skilled pathologists review digitally captured microscopy images from prepared and stained tissue samples in order to make diagnoses. Digital WSI are massive datasets, consisting of images captured at multiple zoom levels. At the greatest magnification levels, a WSI may have a digital resolution upwards of 100 thousand pixels in both dimensions. However, since localized annotations are very difficult to obtain, datasets may only contain WSI-level diagnosis labels, falling into the category of weakly-supervised learning.

SUMMARY OF THE DESCRIPTION

A method and apparatus of a device that classifies an image is described. In an exemplary embodiment, the device segments the image into a region of interest that includes information useful for classification and a background region by applying a first convolutional neural network. In addition, the device tiles the region of interest into a set of tiles. For each tile, the device extracts a feature vector of that tile by applying a second convolutional neural network, where the features of the feature vectors represent local descriptors of the tile. Furthermore, the device processes the extracted feature vectors of the set of tiles to classify the image.

In a further embodiment, the device extracts a target region of an image correlated with a classification of the image. In this embodiment, the device tiles a region of interest of said image into a first set of tiles. The device further, for each tile, extracts a feature vector of that tile by applying a convolutional neural network, the features of the feature vector represent local descriptors of the tile, and computes a score of the tile from the extracted feature vector, where the tile score is representative of a contribution of the tile into the classification of the image. In addition, the device, for each tile, selects at least one other tile having a score verifying a given property and extracts a comparison target region that is a second set of tiles having a score between a high and a low score of the tile scores in the first set of tiles and being in visually proximity to the at least one other tile according to a distance metric.

In yet another embodiment, a device generates a classification model. In this embodiment, the device receives a training set of images, wherein each of the training set of images has an associated known classification. The device further, for each training image in the training set of images, extracts a plurality of feature vectors of the training image by applying a first convolutional neural network, where each of the features of the plurality of feature vectors represents local descriptors of that image. In addition, the device trains the classification model using at least the extracted feature vectors and the associated known classifications.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
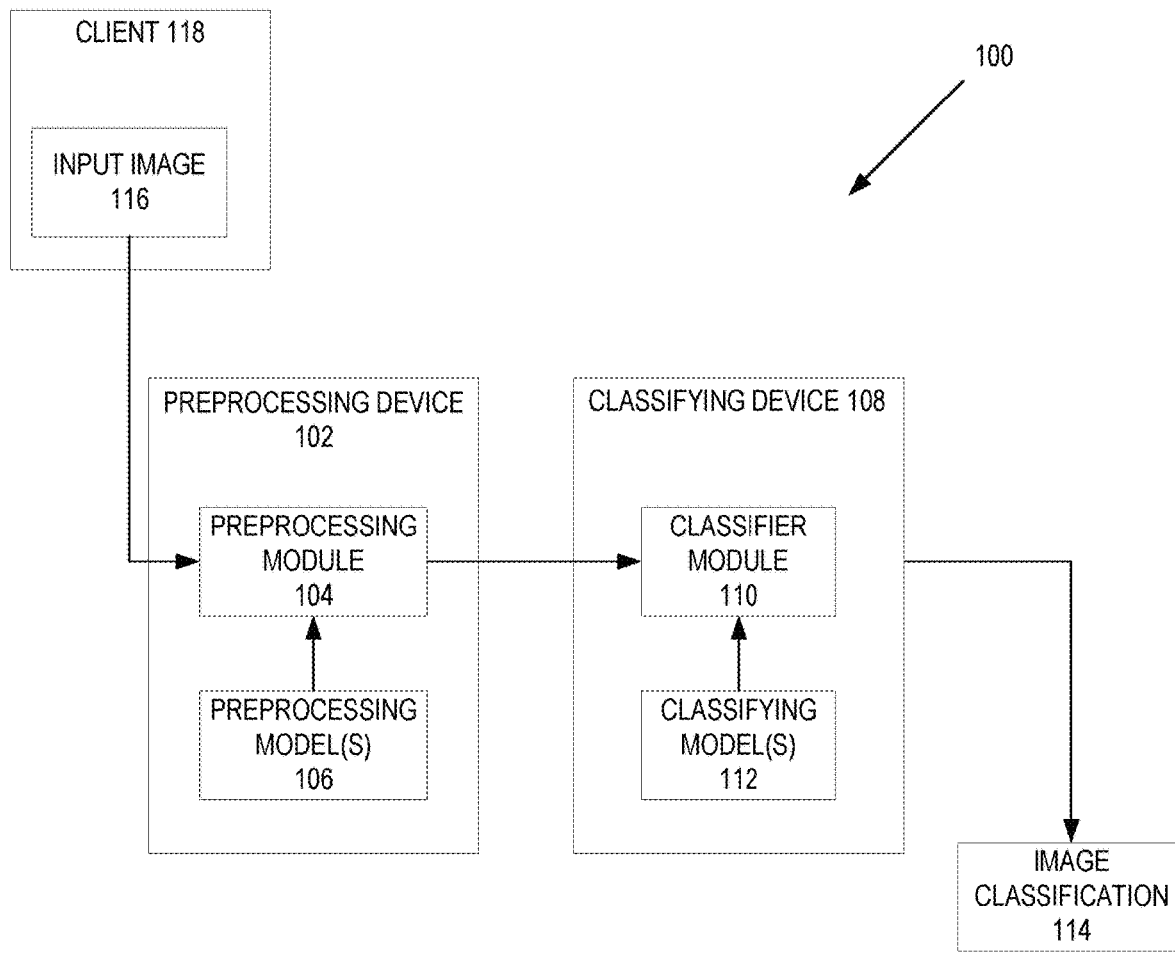
FIG. 1 is a block diagram of one embodiment of a system for classifying an image by preprocessing the image using a classification model.

A method and apparatus of a device that classifies an image is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

As described above, histopathology image analysis can rely on local annotation by an expert before the image can be analyzed, which is slow and laborious. In order to overcome this problem, an image processing pipeline can be used to analyze the image without the use of local annotations. In one embodiment, a local annotation is metadata (e.g., text, marking, number, and/or another type of metadata) that applies to part of the image and not to the image as a whole. For example, in one embodiment, a local annotation can be a marking of a region of interest in an image, such as a histology image. Exemplary local annotations include markings outlining or otherwise identifying a portion of the image, e.g., a tumor region of the image, a stromal region of the image, identification of cell types within the image, identification of biological structures composed of multiple cells in the image, etc. In contrast, reference in the specification to "global annotation(s)" means metadata applied to the image as a whole. Exemplary global annotations include a label identifying the image as a whole, data regarding how the image was acquired, a label identifying a feature of the subject from whom the image is derived, e.g., a label indicating the age, sex, diagnosis, etc. of the subject from whom the image is derived, and/or any other data applying to the image as a whole. In some embodiments, a global annotation can indicate the presence, type, grade, or stage of a tumor known or understood to be present in the subject from whom the image is derived. In other embodiments, a global annotation can indicate a known characteristic of the subject from whom the image is derived, such as duration of survival (e.g., duration of survival following acquisition of the sample represented in the image) or response to a given treatment. In some embodiments described herein, images may be used that contain global annotations, in the absence of local annotations.

The pipeline is based initially on segmenting the large image (e.g. WSI) into smaller images, e.g., 224×224 pixel images, and detecting the region of interest for the image on which to perform classification with Otsu's method. Thus, this classification works on small images, which is far less computationally expensive. These smaller images are fed to a ResNet convolutional neural network to extract a feature vector from each small image, which are the local descriptors for that small image. A score is computed for each small image from the extracted feature vectors, as a local tile level (instance) descriptor. The top and bottom instances are used as input to a Multi-Layer Perceptron (MLP) to perform classification on them. This solution can provide good results, but its overall efficiency could still be improved.

A method and apparatus of a device that improves upon the above pipeline and classifies an image is described. In one embodiment, the device classifies an image using one or more neural network models to determine a label for that image. In this embodiment, the image can be a large image, where it is computationally impractical to process the image as a whole solely using a neural network model. In particular, the device reduces the amount of computing resources (e.g., time and/or memory requirements) needed to perform image classification task on these large images. Such a reduction of resources further improves the performance of the device when executing the image classification task. In addition, the device can classify a whole-slide image, even when this type of image is too large to fit in the memory of a graphics processing unit commonly used to train machine learning models.

In a further embodiment, the device reduces the dimensionality of the data, thus giving better generalization error and is more efficient in terms of model accuracy.

According to one embodiment, the device classifies at least one input image by segmenting the image between at least one region of interest containing information useful for classification and at least one background region containing no information useful for classification, by applying a first convolutional neural network. The device further tiles the at least one region of interest of the image into a set of tiles. In addition, the device extracts a feature vector for each tile by applying a second convolutional neural network, where the features are local descriptors of the tile. Furthermore, the device processes the extracted feature vectors of the tiles in order to classify the image. In one embodiment, by segmenting the input image, the device processes a reduced number of tiles and avoids a processing of the whole image.

In one embodiment, the first convolutional network is a semantic segmentation neural network classifying the pixels of the input image as one of the following two categories: (a) Region of interest; and (b) Background region. Further, the tiling step can be performed by applying a fixed tiling grid to the image, so that said tiles have a predetermined size. In addition, at least one level of zoom can be applied to the tiles obtained. For example and in one embodiment, multiple levels of zoom can be applied to the tiles and tiles at different levels of zoom are combined. In addition, the device can optionally randomly sample the tiles and/or pad the set of tiles with blank tiles, so that the set of tiles comprises a given number of tiles.

In a further embodiment, the second convolutional neural network can be a residual neural network, such as a ResNet50 residual neural network or a ResNet101 residual neural network with the last layer removed using the previous layer as output, or a VGG neural network. This second convolutional neural network can be a pre-trained neural network, allowing the use of a state-of-the-art advanced neural network, without needing to have a large-scale image database and the computational resources to train this neural network.

In one embodiment, the device can compute at least one score of the tile from the extracted feature vector, where each tile score is representative of a contribution of the tile into the classification of the image. With the tile scores, the device can sort the set of the tile scores and select a subset of the tile scores based on their value and/or their rank in the sorted set; and applying a classifier to the kept tile scores in order to classify the image. The device can further apply this classification to multiple input images, where the device can aggregate groups of corresponding tiles from the different input images.

In an alternative embodiment, the device can also aggregate clusters of neighboring tiles. In this embodiment, aggregating a cluster of tiles can include concatenating the tiles of the cluster, selecting a single tile from the cluster according to a given criterion, using the cluster as a multi-dimensional object, or aggregating the values for example through a mean or a max pooling operation. In addition, the device can apply an autoencoder on the extracted feature vectors so as to reduce the dimensionality of the features. In one embodiment, the image can be a histopathology slide, the region of interest being a tissue region, and the classification of the image being a diagnosis classification.

In an alternative embodiment, when local annotations are available, such as the presence of tumors in regions of the slides, a hybrid technique can be used to take those annotations into account. To do so, the device can train the machine learning model for two concurrent tasks: (1) the local prediction of the presence of macroscopic properties on each tile (e.g., presence of tumors or other types of macroscopic properties) and the prediction of a set of global labels. A complex architecture can be used by the device (or multiple devices) that involves, on one side, the classification system described above to process a set of 128 features. On the other side, the device applies a convolutional neural network to transform the features of the N tiles into an N*128 features vector. Based on this vector, the device trains a convolutional neural network to predict, for each tile, the presence or absence of tumor (or some other macroscopic property). The device can take both the output of the prediction and the N*128 features vector and apply an operation of weighted pooling on the concatenation of those two vectors to get a 128 features vector for the input image. The device concatenates the classification model's output and the 128 features obtained and try to predict based on this vector, a set of global labels for that image (e.g., survival, tumor size, necrosis, and/or other types of predictions). The loss of the model involves both global and local predictions. In this embodiment, by adding information derived from the local annotations into the computational flow, the performance of the overall model can be increased.

FIG. 1 is a block diagram of one embodiment of a system for classifying an image by preprocessing and classifying the image using preprocessing and classification models. In FIG. 1, the system 100 includes a client 118 that is coupled to a preprocessing device 102, which is coupled to a classifying device 108. In one embodiment, the preprocessing device 102 and classifying device 108 receive the input image and output an image classification using the preprocessing model(s) 106 and classifying model(s) 112. In this embodiment, the image classification can be one of different labels, a number selected from a range of numbers, and/or other types of classification.

In one embodiment, each of the client 118, the preprocessing device 102, and classifying device 108 can be a personal computer, laptop, server, mobile device (e.g., smartphone, laptop, personal digital assistant, music playing device, gaming device, etc.), and/or any device capable processing an image. In one embodiment, the client 118, preprocessing device 102, and/or classifying device 108 can each independently be a physical or virtual device. In one embodiment, the client 118 can be a device used by a user to determine a classification for the image, such as a medical professional that wishes to determine a prognosis for a patient from the image. In one embodiment, the image can be a large image that is in the order of gigabytes or larger. For example and in one embodiment, the image can be a digital image of a histopathology slide (e.g., WSI), where the image can be of the order of a few gigabytes or greater. While in one embodiment, the image is a histopathology slide, in alternate embodiments, the image can be another type of image (e.g., satellite image, astronomical image, wind turbine images, another type of medical image, and/or any other type of large image).

In a further embodiment, preprocessing device 102 segments the image into a region of interest and a background region. In this embodiment, by extracting a region of interest from the input image can decrease the amount of computation needed to classify the input image. For example and in one embodiment, because histopathology slides (or other types of images) can include empty region(s) of the image with little or no tissue at all, it is useful to introduce what is called a "tissue detection" or "matter detection" method in order to evaluate if a region of the slide contains any tissue. More generally, when the goal is to classify a large image, it is relevant to identify regions of interest in the image and differentiate them from background regions. These regions of interest are the regions of an image containing valuable information for the classification process. In addition, the background regions are areas of the image that include little or no valuable information, where the background regions could be considered as noise for the task at hand. Image segmentation is further described in FIG. 3 below.

In one embodiment, with a segment image, the preprocessing device 102 can tile the image. In this embodiment, tiling is the process of partitioning the image into a group of image subsets. The image subsets can be of a fixed size or can be of varying sizes. In addition, the tiling can be based on the region of interest that is generated from the image segmentation described above. Tiling is further described in FIG. 3 below.

In a further embodiment, the preprocessing device 102 determines the features of the image using a convolutional neural network. In this embodiment, the preprocessing device 102 computes a feature vector for each tile is the set of tiles. These feature vectors can be used to classify the image by a classifier. Determining the features is further described in FIG. 3 below. In one embodiment, the preprocessing device 102 includes a preprocessing module 104 to perform the functionality of the preprocessing device 102 using one or more the preprocessing models 106.

In one embodiment, the preprocessing device 102 can send the tile set and the feature vectors to the classifying device 108, where the classifying device 108 classifies the input image 114 using the tile set, feature vectors, and a classifying model 112. In this embodiment, the classifying device 108 computes a tile score for each of the tiles in the set of tile, sorts the tile set and selects a subset of tiles from the tile set. With the tile subset, the classifying device 112 classifies the image from the subset of tiles and outputs the image classification 114. In one embodiment, the image classification is sent to the client 118. In alternative embodiments, the image classification 114 (and possibly along with the input image) can be stored in a repository, where the client can retrieve the input image 116 and/or image classification 114. Classifying the image using the tiles is further described in FIG. 3 below. In one embodiment, the functionalities of either the preprocessing device 102 or the classifying device 108 can be performed by the other device or alternatively, one device can perform the functionalities of the preprocessing device 102 and the classifying device 108. In one embodiment, the classifying device 108 includes a classifying module 110 to perform the functionality of the classifying device 108 using one or more the classifying models 112.

As described in FIG. 1, a client uses the preprocessing device 102 and/or classifying device 108 to preprocess and classify an image. In one embodiment, each of the preprocessing model 106 and/or classifying model 112 can be trained using a set of input image that have known properties. For example and in one embodiment, the classification model 112 can be trained using a set of input images and a set of known labels for each of the input images. Furthermore, the set of input image may also include information that can be used to train the image segmentation model.

Figure 2:
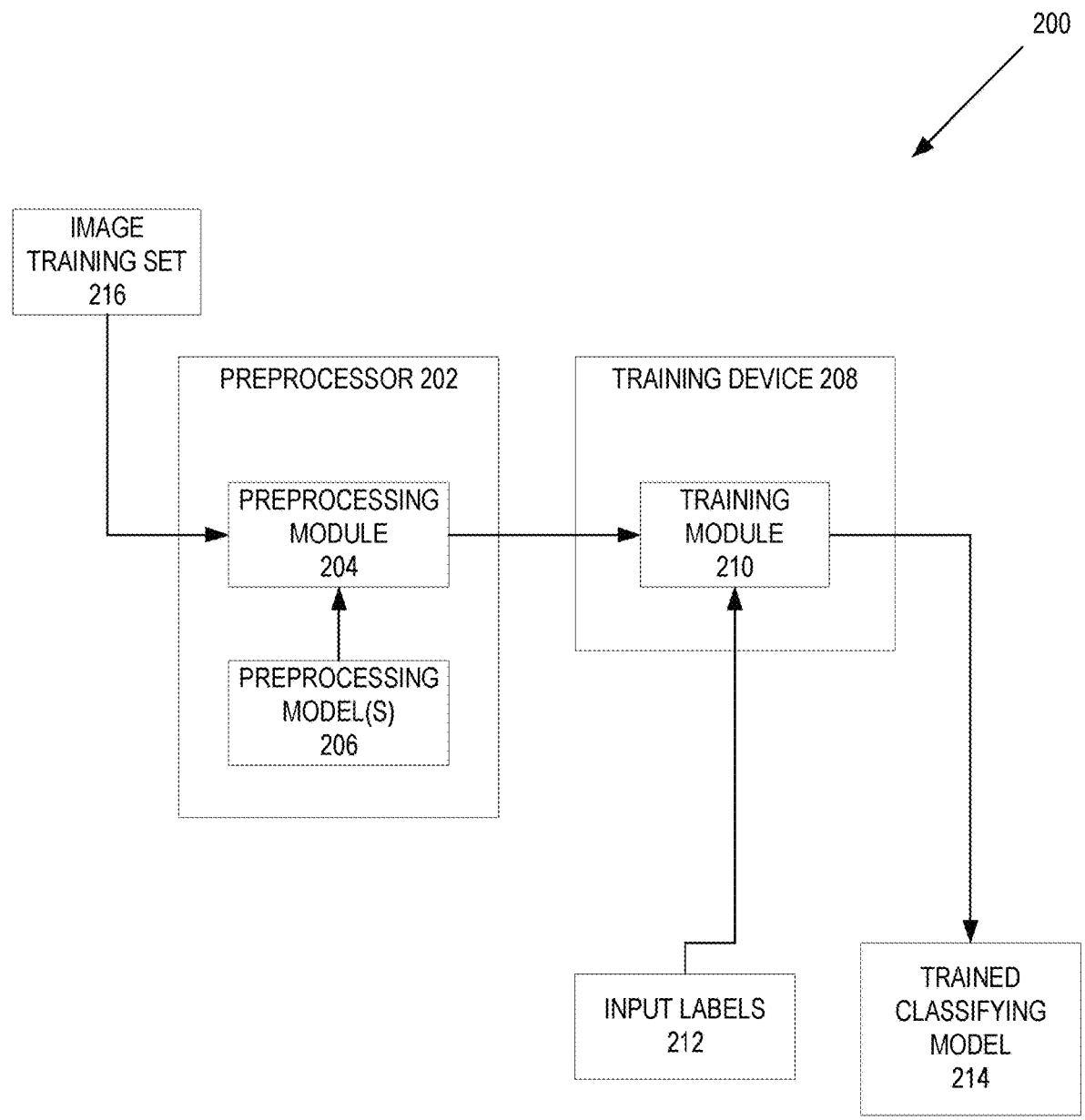
FIG. 2 is a block diagram of one embodiment of a system for training a classification model using a set of training images.

FIG. 2 is a block diagram of one embodiment of a system 200 for training a classification model using a set of training images 216. In FIG. 2, the system 200 includes a preprocessing device 202 that is coupled to a training device 206. In one embodiment, the preprocessing device 202 receives the image training set 216 and generates a set of feature vectors for each of the images in the image training set 216. The training device 208 can receive the feature vector sets and train a classifying model 214 using input labels 212 associated with the image training set 216. The training is further described in FIG. 6 below.

Figure 3:
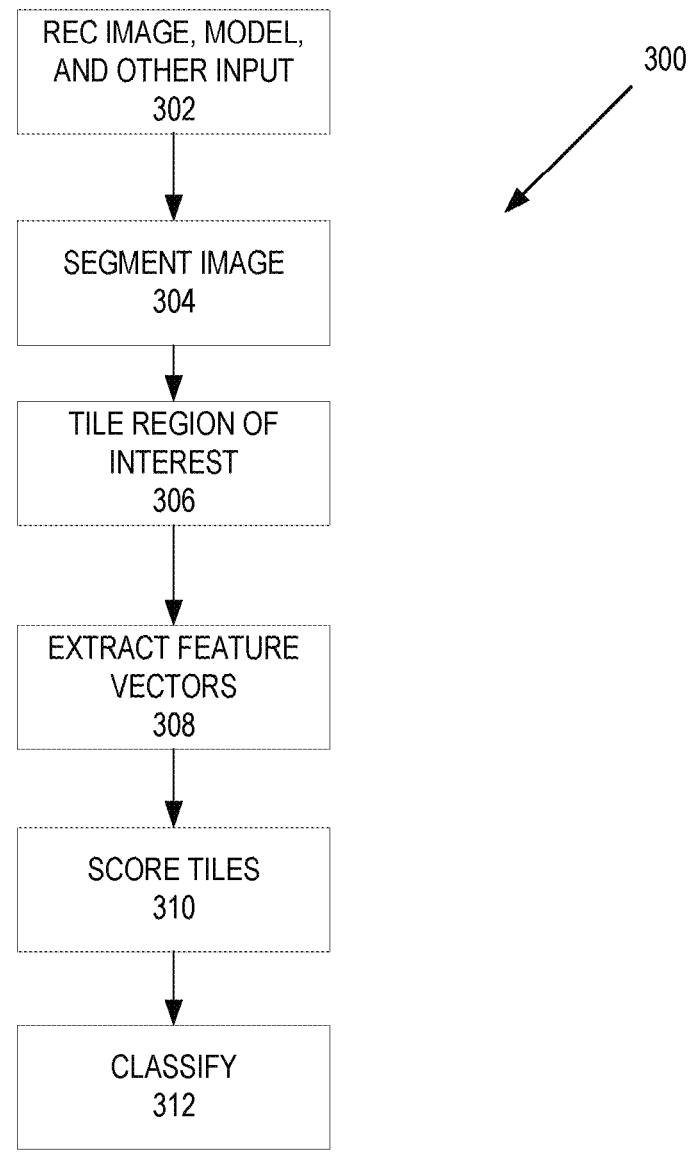
FIG. 3 is a flow diagram of one embodiment of a process to preprocess and to classify an image.

As per above, the preprocessing model 102 and classifying device 108 can preprocess and classify an image. FIG. 3 is a flow diagram of one embodiment of a process 300 to preprocess and classify an image. In one embodiment, either the preprocessing device 102 and/or classifying device performs the functionalities of process 300. In FIG. 3, process 300 begins by receiving the image, the model(s), and other input at block 302. In one embodiment, the input image can be a histopathology image, satellite image, astronomical image, wind turbine images, another type of medical image, and/or any other type of large image. In this embodiment, the model is one or more models that can be used to preprocess and/or classify images. For example and in one embodiment, the model can include an image segmentation model that is used to segment the image and a classification model that is used to classify the image. Furthermore, the other input can include the weights and other input parameters used by process 300.

At block 304, process 300 segments that input image. In one embodiment, process 300 segments the input image into a region of interest and a background region. In this embodiment, by segmenting an image, process 300 can extract the region of interest for the input image. In this embodiment, extracting the region of interest from the input image can decrease the amount of computation needed to classify the input image. For example and in one embodiment, histopathology slides (or other types of images) can include empty region(s) of the image with little or no tissue at all, thus it is useful to introduce what is called a "tissue detection" or "matter detection" method in order to evaluate if a region of the slide contains any tissue. More generally, when the goal is to classify a large image, it is relevant to identify regions of interest in the image and differentiate them from background regions. These regions of interest are the regions of an image containing valuable information for the classification process and background regions are areas of the image that include little or no valuable information, where the background regions could be considered as noise for the task at hand. In order to realize this task, various different types of image segmentation schemes can be used. For example and in one embodiment, Otsu's method can be used to segment the image, where Otsu's method is a simple thresholding method based on the intensity histogram of the image. In this embodiment, segmenting the image using Otsu's method has shown pretty good results when the image contains two classes of pixels following a bimodal distribution, for example foreground pixels and background pixels or, more specifically tissue and non-tissue. However, this method is known to perform badly on complex images when the histogram of intensity level cannot be assumed to have a bimodal distribution. This calls for a more robust technique in order to improve the overall efficiency of the method.

In another embodiment, and in order to improve the robustness of the image segmentation and to be able to tackle complex images, a semantic segmentation neural network can be used to segment the images, such as a U-NET semantic segmentation neural network, a SegNet, a DeepLab or another type of semantic segmentation neural network. In this embodiment, a semantic segmentation neural network can be used that does not depend on a particular distribution in the intensity histogram. Moreover, using such a neural network allows the image segmentation to take into account multichannel images such as RGB images. Thus, the segmentation does not just rely on the histogram of pixel intensity but can take advantage of the semantics of the image. In one embodiment, the semantic segmentation neural network is trained to segment the tissue from the background, such as to differentiate a stained or unstained tissue from a background. In an alternate embodiment, for a different type of image, the semantic segmentation neural network can be trained to differentiate a foreground for that type of image from a background.

In a further embodiment, the original image can be downsampled in order to make the image segmentation step less computationally expensive. As will be described further below and in one embodiment, some of the image analysis is performed at a tile level (which is a subsection of the image), using the semantic segmentation on a downsampled version of the image does not degrade the quality of the segmentation. This allows the use of downsampled image without really degrading the quality of the segmentation. Then, to obtain the segmentation mask for the original full resolution image, one simply needs to upscale the segmentation mask generated by the neural network.

In another embodiment, another advantage of using a U-NET segmentation neural network is that this network type has been developed for biomedical image segmentation and thus, complies with the usual constraint of biomedical data which is having small datasets of very high dimensionality. Indeed, the U-NET segmentation neural network is a model that has few parameters to train, making it possible to train this network with fewer training examples. Moreover and in another embodiment, using data augmentation techniques on the training data can yield very good results with this architecture allowing to get more training examples from the same training sets.

Process 300 tiles the image into a set of image tiles at block 306. In one embodiment, process 300 uses the tiling to increase the ability of preprocessing the images. For example and in one embodiment, using a tiling method is helpful in histopathology analysis, due to the large size of the whole-slide image. More broadly, when working with specialized images, such as histopathology slides, or satellite imagery, or other types of large images, the resolution of the image sensor used in these fields can grow as quickly as the capacity of random-access memory associated with the sensor. With this increased image size, it is difficult to store batches of images, or sometimes even a single image, inside the random-access memory of a computer. This difficulty is compounded if trying to store these large images in specialized memory of a Graphics Processing Unit (GPU). This situation makes it computationally intractable to process an image slide, or any other image of similar size, in its entirety.

In one embodiment, by process 300 tiling the image (or region of interest) addresses this challenge by dividing the original image (or region of interest), into smaller images that are easier to manage, called tiles. In one embodiment, the tiling operation is performed by applying a fixed grid to the whole-slide image, using the segmentation mask generated by the segmentation method, and selecting the tiles that contain tissue, or any other kind of region of interest for the later classification process. In order to reduce the number of tiles to process even further, additional selection method can be used, such as random subsampling to keep only a given number of slides.

For example and in one embodiment, process 300 divides the region of interest into tiles of fixed size (e.g., each tile having a size of 224×224 pixels). Alternatively, the tile size can be smaller or larger. In this example, the number of tiles generated depends on the size of the matter detected and can vary from a few hundred tiles to 50,000 or more tiles. In one embodiment, the number of tiles is limited to a fixed number that can be set based on at least the computation time and memory requirements (e.g., 10,000 tiles).

Additionally, process 300 can apply a zoom level to the tiles generated by the grid, where the zooming operation being adapted so that every tile has the same dimensions. The choice of the zoom is a trade-off between details and context: having a higher zoom level allows process 300 to extract more detailed information in a tile, whereas having a lower zoom level keeps the context of a selected area. To benefit from multiple levels of zoom, process 300 can extract tiles at multiple levels of zoom, making the model able to extract more information from a given slide. These multiple levels of zoom can be combined by concatenating multiple tiles at different zoom levels having the same center location.

At block 308, process 300 extracts feature vectors from the tile set. In one embodiment, feature extraction aims at building derived values, intended to be informative and non-redundant, facilitating the subsequent learning and generalization steps, from the tiles created from the input image. In one embodiment, the extracted features are in the form of numeric vectors also called local descriptors.

In one embodiment, process 300 can use any feature extraction neural network, such as a ResNet based architecture (ResNet-50, ResNet-101, ResNetX etc.), Visual Geometry Group (VGG) neural network, Inception neural network, an autoencoder for unsupervised feature extraction, a custom-made neural network, specifically designed for the task, or even non neural network feature extractors such as SIFT or CellProfiler. Moreover, the feature extraction neural network used can be a pre-trained one as these are trained on very large-scale datasets, and thus have an optimal generalization accuracy.

In one embodiment, process 300 uses a ResNet-50 neural network as this neural network can provides well suited features for image analysis without requiring too much computing resources. For example and in one embodiment, the ResNet-50 can be used for histopathological image analysis. In this example, the ResNet-50 neural network relies on residual blocks that allow the neural network to be deeper and still improve its accuracy, as simple convolutional neural network architectures can get worst accuracies when the number of layers grows too large. In one embodiment, the weights of the ResNet-50 neural network can be the weights used for the feature extraction are from a pre-training on the dataset ImageNet, since this dataset is a really general-purpose image dataset. In one embodiment, using a neural network pre-trained on a large independent image data set provides good features independently of the kind of images, even in the case where the input images are specialized, as is for histopathological images (or other types of images). In this embodiment, process 300 uses ResNet-50 convolutional neural network to extract 2,048 features per tile. If process 300 extracts tiles, for example, process 300 generates a matrix of 2,048×10,000. Furthermore, if process 300 is being executed with a number of images as input then process 300 generates a tensor with dimensions of: number of images×number of features/tile×number of tiles.

Process 300, in one embodiment and in order to extract features for a given slide, processes each of the selected tiles goes through the ResNet-50 neural network outputting the feature vector for that tile. In this embodiment, the feature vector can be a vector of dimensional 2048. In addition, process 300 can apply an autoencoder to the feature vectors to further provide dimensionality reduction and reduce the dimensions of the feature vectors to 256 (or another dimensional) for example. In one embodiment, the autoencoder can be used when the machine learning model may be susceptible to over fitting. For example and in one embodiment, process 300 can reduce the length of a 2,048 feature vector down to a 512 length feature vector. In this example, the process 300 can optionally use an autoencoder, which includes a single hidden-layer architecture (of 512 neurons). This prevents the model from over-fitting by finding several singular features in the training dataset and also reduces computation time and required memory. In one embodiment, the classification model is trained on a small subset of the image tiles, e.g., trained on 200 tiles randomly selected from each slide (pout of a total of 411,400 tiles).

Process 300 can optionally perform a zero-padding operation on the feature vectors, in order to derive a minimal number of features. In this embodiment, process 300 can perform a zero-padding to add feature vectors to the set of feature vectors for the image if the number of feature vectors is below a minimal number of feature vectors. In this embodiment, each zero-padded feature vector has null values.

Process 300 scores each of the tiles at block 310. In one embodiment, process 300 reduces each of the feature vectors to one or more scores using a connected neural network. In one embodiment, process 300 can reduce the feature vector to a single score using a fully connected neural network, or to multiple scores representing various characteristics of the tile using one fully connected neural network outputting various scores, or to a plurality of fully connected neural networks, each outputting a different score. These scores, associated with one tile, are sorted and a subset of the tiles is selected for the image classification. In one embodiment, this subset of tiles can be tiles with the top R highest scores and the bottom R lowest scores, the top R highest scores, the bottom R lowest scores, and/or any weighted combination of the scores. Finally, these scores are concatenated into an image score vector that can be taken as input for the image classification.

For example and in one embodiment, process 300 can use a convolutional 1D layer to create a score for each tile. In the example described above with feature vectors of 2,048 length, this convolutional layer performs a weighted sum between all 2,048 features of the tile to obtain this score, where weights of this sum are learned by the model. Furthermore, because process 300 uses a convolutional 1D layer that has a bias of zero, the zero-padding tiles have a score of zero and, thus, the zero-padding tiles are each a reference for a totally uninformative tile. Process 300 picks the highest and lowest R scores and uses them as input for the classifying described below. This architecture ensures which tiles are used to make the predictions and therefore, how process 300 predicts the result. Tile scoring is further described in FIG. 4 below.

At block 312, process 300 classifies the image using the tile scores to predict one or more global labels for the image. In one embodiment, process 300 uses the image score vector as input to a dense multilayer neural network to provide the desired classification. This classification can be any task that associates labels to the data given as input to the classifier. In one embodiment, using a trained classifier for histopathology slide image inputs, since said input data is derived by the whole pipeline, the classifier is thus capable to label the histopathology slide given as input, or any other kind of image, without needing to process the full image, which can be computationally prohibitive. For example and in one embodiment, the labels can be a label of any kind, such as: binary values representing prognosis of a given pathology; numeric labels representing a score, a probability, or a prediction of a physical quantity, such as survival prediction or response to treatment prediction; and/or a scalar label as described previously or a vector, matrix or tensor of such labels representing structured information. For example and in one embodiment, process 300 can output a continuous risk score as the classification for mesothelioma histopathology input images, which can be used to determine an estimated survival duration of a subject. In this example, different continuous output scores for different subject that can be plotted against similar risk scores derived from a plurality of mesothelioma subjects of known survival duration, to determine an estimated survival time for the individual test subject. In one embodiment, process 300 uses a multi-layer perceptron (MLP) with two fully connected layers of 200 and 100 neurons with sigmoid activation. In this embodiment, the MLP is used as a core of the predictive algorithm that transforms the tile scores to label(s). While in one embodiment, process 300 predicts a single label for the image (e.g., a risk score), in alternate embodiments, process 300 can predict multiple global labels for the image. In one embodiment, process 300 can perform a multi-task learning to predict multiple global labels. For example and in one embodiment, the classification model (e.g., the MLP and/or other models described elsewhere) can be trained to predict multiple labels at once in the multi-task learning setting (e.g., survival or disease-free survival, clinical data, tumor size, vascular invasion, necrosis, and/or other types of predictions).

Figure 4:
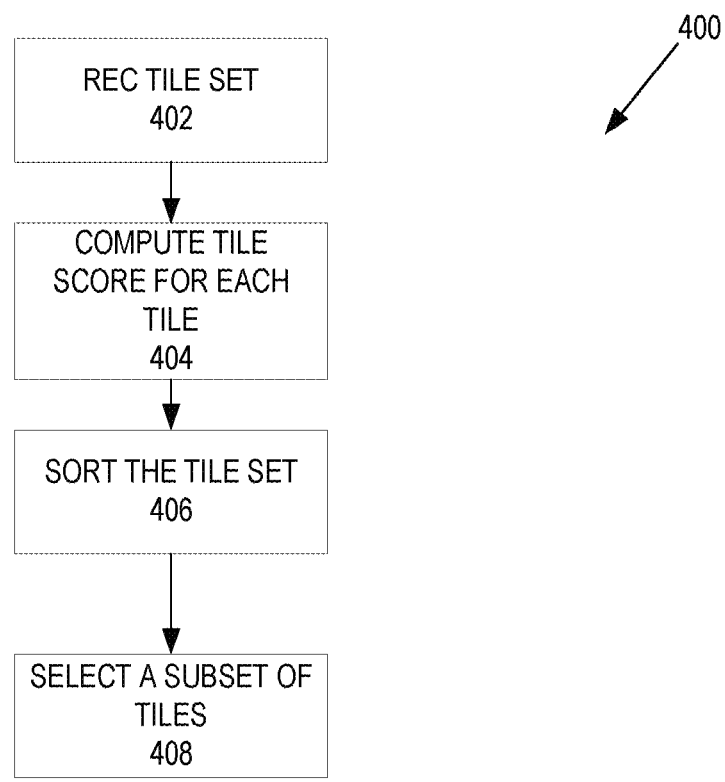
FIG. 4 is a flow diagram of one embodiment of a process to classify an image that is tiled into a set of tiles.

As can be seen from FIG. 3, the image can be classified based on at least a set of tile scores that are derived from the image tile feature vectors generated from the neural network. FIG. 4 is a flow diagram of one embodiment of a process 400 to score an image that is tiled into a set of tiles. In one embodiment, a process, such as process 300 at block 310 performs process 400 to score the image. In FIG. 4, process 400 begins by receiving the tile set at block 402. In one embodiment, the tile set is the tile set that is generated in FIG. 3 at block 306. In addition, the tile set includes a feature vector for each tile in the tile set. At block 404, process 400 computes a tile score for each tile using the associated feature vector for that tile. For example and in one embodiment, process 400 can use a convolutional 1D layer to create a score for each tile. In the example described above with feature vectors of 2,048 length, this convolutional layer performs a weighted sum between all 2,048 features of the tile to obtain this score, where weights of this sum are learned by the model. Furthermore, because the convolutional 1D layer is unbiased, the zero-padding tiles have a score of zero and thus a reference for a totally uninformative tile.

At block 406, process 400 sorts the tile set. In one embodiment, process 400 sorts the tile set to determine the top R and/or bottom R scores for block 408 below. Process 400 selects a subset of tiles at block 408, where this subset of tiles is used for the classification step later on. In one embodiment, this subset of tiles can be tiles with the top $R_{top}$ highest scores and the bottom $R_{bottom}$ lowest scores, the top $R_{top}$ highest scores, the bottom $R_{bottom}$ lowest scores, and/or any weighted combination of the scores. In one embodiment, the ranges of values for $R_{top}$ and/or $R_{bottom}$ can be the same or different. In addition, the $R_{top}$ and/or $R_{bottom}$ ranges can be a static numerical range (e.g., 10, 20, 100, or some other number), adapted to a range, a percentage, a label (e.g., small, large, or some other label), set via a user interface component (slider, user input, and/or another type of user interface component), and/or some other value. In one embodiment, process 400 additionally concatenates these scores into an image score vector that can be taken as input for the image classification.

In one embodiment, when studying histopathology whole-slide images (or slides), a patient (or subject) can be associated with multiple slides, taken with various stainings, at various locations of the same sample, from multiple organs, or at various time points. In this embodiment, the slides from a single patient can be aggregated in multiple ways. In one embodiment, process 300 can concatenate the slides, in order to form a larger slide that will be processed in the same or similar way as a normal one (segmentation, tiling, feature extraction and classification).

In a further embodiment, process 300 can handle the multiple slides as a three-dimensional image. This can be particularly useful when the slides are multiple consecutive slices of the same tissue. In this case, a 3D Convolutional Neural Network (CNN) can be used for the feature extraction step in order to get the most information out of the given set of slides. Furthermore, by applying the segmentation, tiling and feature extraction steps to the plurality of slides and keeping only a given number of features so as to match the input dimensions of the classifier use, the features selected could be for example the N maximum features and M minimum features for each tile. This approach is particularly suitable in the case where the plurality of slides to be assembled is a batch of the same slide but using various stainings.

In another embodiment, process 300 can cluster the tiles that are close according to a distance metric computed on the image or on the features and aggregating their associated feature vectors by computing the mean, the maximum or a weighted sum of the feature vectors. This allows process 300 to reduce the dimensionality of the problem greatly by starting from a large number of tiles (for example 10,000 tiles) and aggregating them into a small number of clusters (for example 200), this decreases the computation time but also reduces overfitting and giving the models better generalization error. More particularly a good distance metric for selecting the tiles to aggregate is the Euclidean distance in the whole-slide image, for example aggregating all the tiles contained in a 1 mm$^2$ patch on the slide.

In another embodiment, a slide may not contain enough useful tissue to extract tiles on which to apply the feature extraction step and thus to feed the classifier with features. In this case, the input of the classifier is zero padded, meaning that for every tile lacking, a feature consisting only of zeros is added to the real features computed by the feature extractor.

Figure 5:
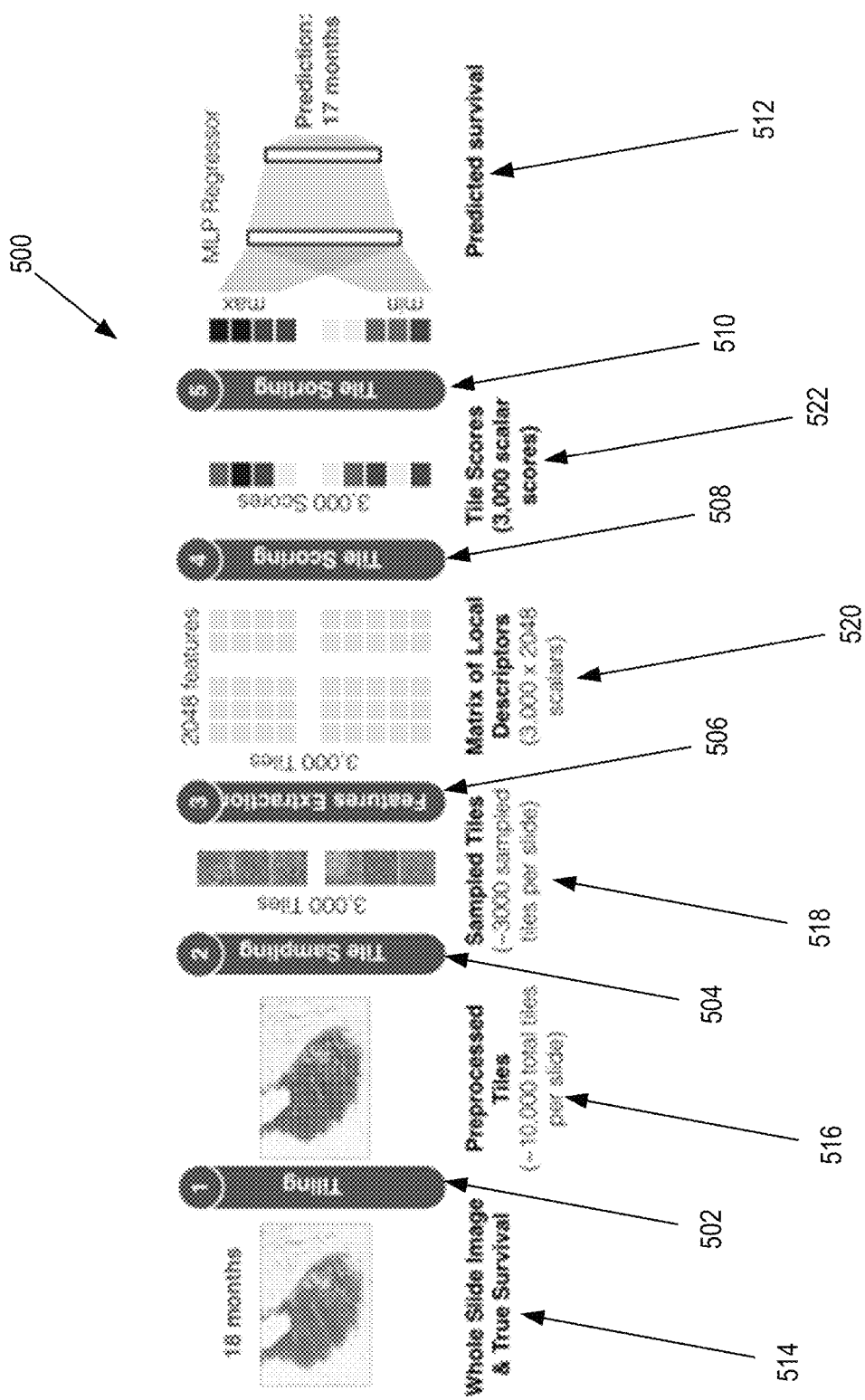
FIG. 5 is an illustration of a classification system for a histopathology image classification.

As described above, one example of the image classification is for classification for histopathology images. In this example, the computed label is a prediction value for a patient based on an input histopathology slide image. FIG. 5 is an illustration of a classification system 500 for a histopathology image classification. In FIG. 5, the classification system 500 includes the functions of tiling 502, tile sampling 504, feature extraction 506, tile scoring 508, tile sorting 510, and classification (in this case, predicting survival) 512. In one embodiment, the tiling 502 function receives the whole slide image 514 and outputs a set of preprocessed tiles 516. In this embodiment, the number of tiles for the image can be on the order of 10,000 tiles. In a further embodiment, there can be a bigger or lower number of tiles for the image. In one embodiment, and to reduce the computational complexity, the classification system 500 samples the tiles 504 to reduce the number of tiles 518 that are used in the neural network computations. In one embodiment, the classification system 500 samples the tiles 504 randomly or some other type of sampling mechanism. For example and in one embodiment, the classification system 500 randomly samples the tiles 504 to reduce the number of tiles from on the order of 10,000 tiles to on the order of a few thousand tiles (e.g., 3000 tiles).

In one embodiment, the classification system 500 performs a feature extraction 506 function on the sampled tiles. In this embodiment, the classification system 500 uses a convolutional neural network to extract the features on the sampled tiles that results in a matrix of local descriptors 520 (e.g., using a ResNet-50, or another type of feature extraction mechanism described above). Furthermore, and in one embodiment, the classification system 500 scores 522 the tiles based on at least the tile feature vectors 508. In this embodiment, the classification system 500 uses a 1D convolutional neural network to generate the scores for each of the image tiles. The classification system 500 additionally sorts the tiles scores 510, where the sorted tiles are used by a MLP regressor to generate a predicted survival 512. In one embodiment, each of these functions performed by the classification system 500 are the same or similar to the functions described in FIG. 3 above.

In one embodiment, the selection of the tiles can be used by an investigator to determine correlations between patterns in the image and relevant global labels associated with the image or with an entity associated with the image (e.g., a patient, subject of a satellite or wind turbine image, etc.). In this embodiment, for a particular type of image, the investigator can review selected tiles from images with known (or unknown) labels to determine correlations. For example and in one embodiment, an investigator can review selected tiles from histopathology images processed by process 300 and compare the selected tiles with corresponding image labels or other corresponding data that indicate length of survival so as to discover or correlate trends between survival and histopathology image features indicated by the selected tiles.

As previously mentioned, and in one embodiment, this method is illustrated for use in histopathological image analysis where the task can aid a pathologist in disease detection tasks. However, processes 300 and/or 400 can be applied to any type of image processing problem where running a classifier on an entire image is computationally intractable. One of such use cases can be for example classifying high resolution from satellite imagery. In this example, the semantic segmentation neural network and the classifier (e.g., the MLP regressor and/or other model(s)) are trained to classify high resolution satellite imagery.

Figure 6:
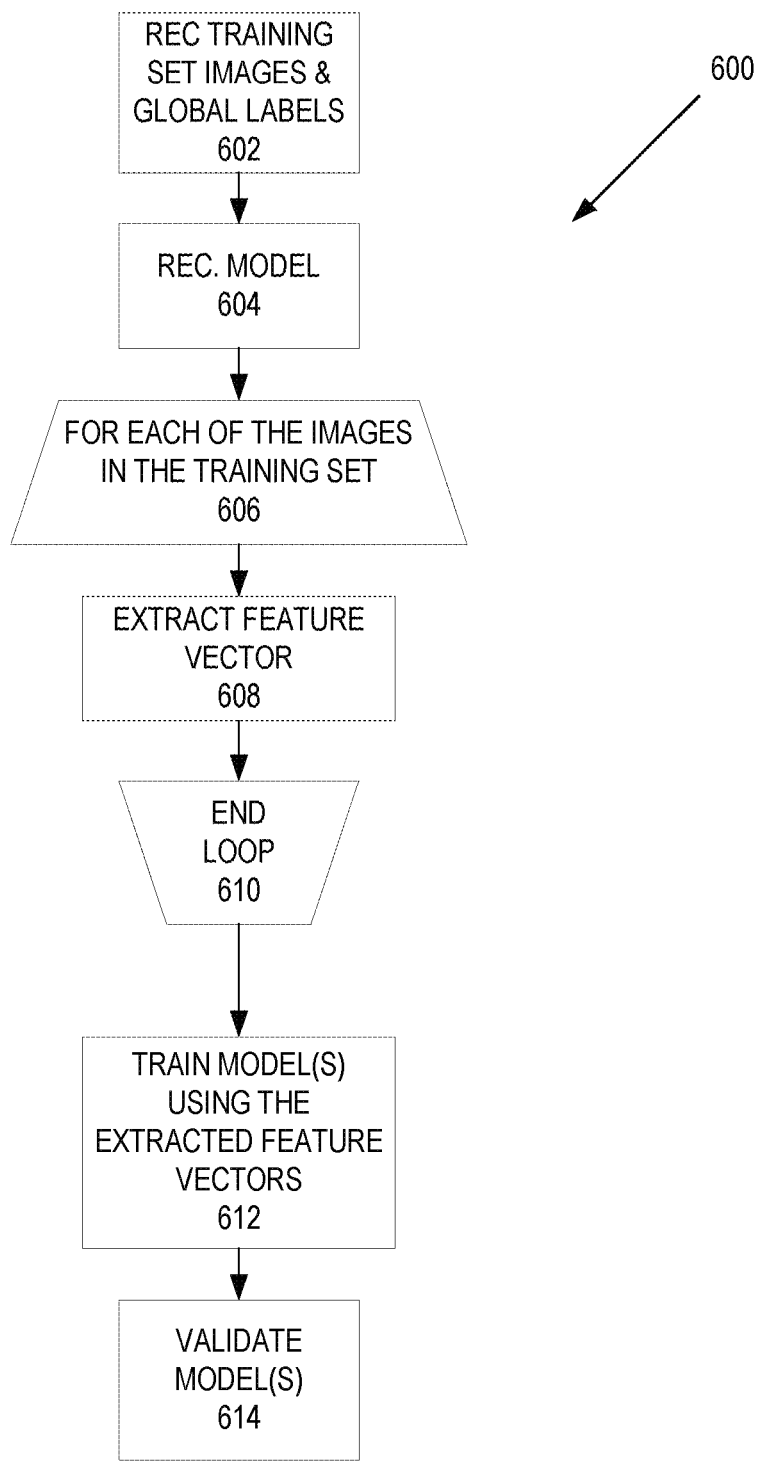
FIG. 6 is a flow diagram of one embodiment of a process to train and validate a classification model.

As per above, process 300 uses trained model(s) to determine the label(s) for each input image. In one embodiment, process 300 uses a trained model for the image segmentation, scoring convolutional neural network, and the classification. In this embodiment, each of these trained models is trained for a particular category of images (e.g., histopathology image slides, satellite imagery, and/or other types of image categories). In a further embodiment, some of the models used in FIG. 3 are trained end-to-end, where the models are trained together. In this embodiment, some of the models used in FIG. 3 can be trained together, such as the MLP used to classify the image and the one dimensional convolutional neural network used to score the tiles. In addition, other models used in FIG. 3 can be trained separately on different training sets (e.g., the ResNet model, U-Net, and/or other types of models). FIG. 6 is a flow diagram of one embodiment of a process 600 to train and validate a classification model. In one embodiment, the classification model can include one or more separate models used for the classification process described in FIG. 3 (e.g., MLP and/or the one dimensional convolutional neural network). In FIG. 6, process 600 begins by receiving a training set of images at block 602. In one embodiment, the training set of images is used to train the classification model (and/or other models used in process 300) for a particular category of images. For example and in one embodiment, the set of images can be histopathology slide images that have been labeled in relation to a particular type of disease, such as cancer. At block 604, process 600 receives the model. In one embodiment, the model is a classification model, such as an MLP model and other model(s) described above.

Process 600 performs a processing loop (blocks 606-610) to generate a set of feature vectors for the training set of images. At block 608, process 600 extracts the feature vector for an image in the training set. In one embodiment, process 600 extracts the feature vector as described in FIG. 3 above. For example and in one embodiment, process 600 uses a ResNet-50 convolutional neural network to determine the feature vector for each tile of a tiled segment image as described in FIG. 3 above. In one embodiment, process 600 generates a set of feature vectors for the training image. In addition, process 600 can perform data augmentation during the training of the method to improve the generalization error. This data augmentation can be done by applying various transformations on the tiles such as rotations, translations, cropping, adding noise to the image, modifying the intensity of particular colors, or changing the contrast. The process loop ends at 610.

Process 600 trains the model(s) using the extracted feature vectors for the training set of images and input labels for the training set of images at block 612. In one embodiment, process 600 trains the one dimensional convolutional neural network and the MLP classification model together using the labels of the training set of images. In this embodiment, process 600 iteratively trains the model(s) by computing the score sets for the training image, predicting the labels, determining differences between the predicted labels and the input labels, optimizing the model(s) based on the difference (e.g., computing new weights for the model(s)), until the differences are within a threshold. While in one embodiment, process 600 trains the models to predict a single label for the image (e.g., a risk score), in alternate embodiments, process 600 can be trained to predict multiple global labels for the image. In one embodiment, process 600 can be trained to perform a multi-task learning to predict multiple global labels. For example and in one embodiment, the classification model (e.g., the MLP and/or other model(s) described elsewhere) can be trained to predict multiple labels at once in the multi-task learning setting (e.g., survival or disease-free survival, clinical data, tumor size, vascular invasion, necrosis, and/or other types of predictions). In order to determine the adequacy of the training, process 600 validates the classification model at block 614. Validation is further described in FIG. 7.

Figure 7:
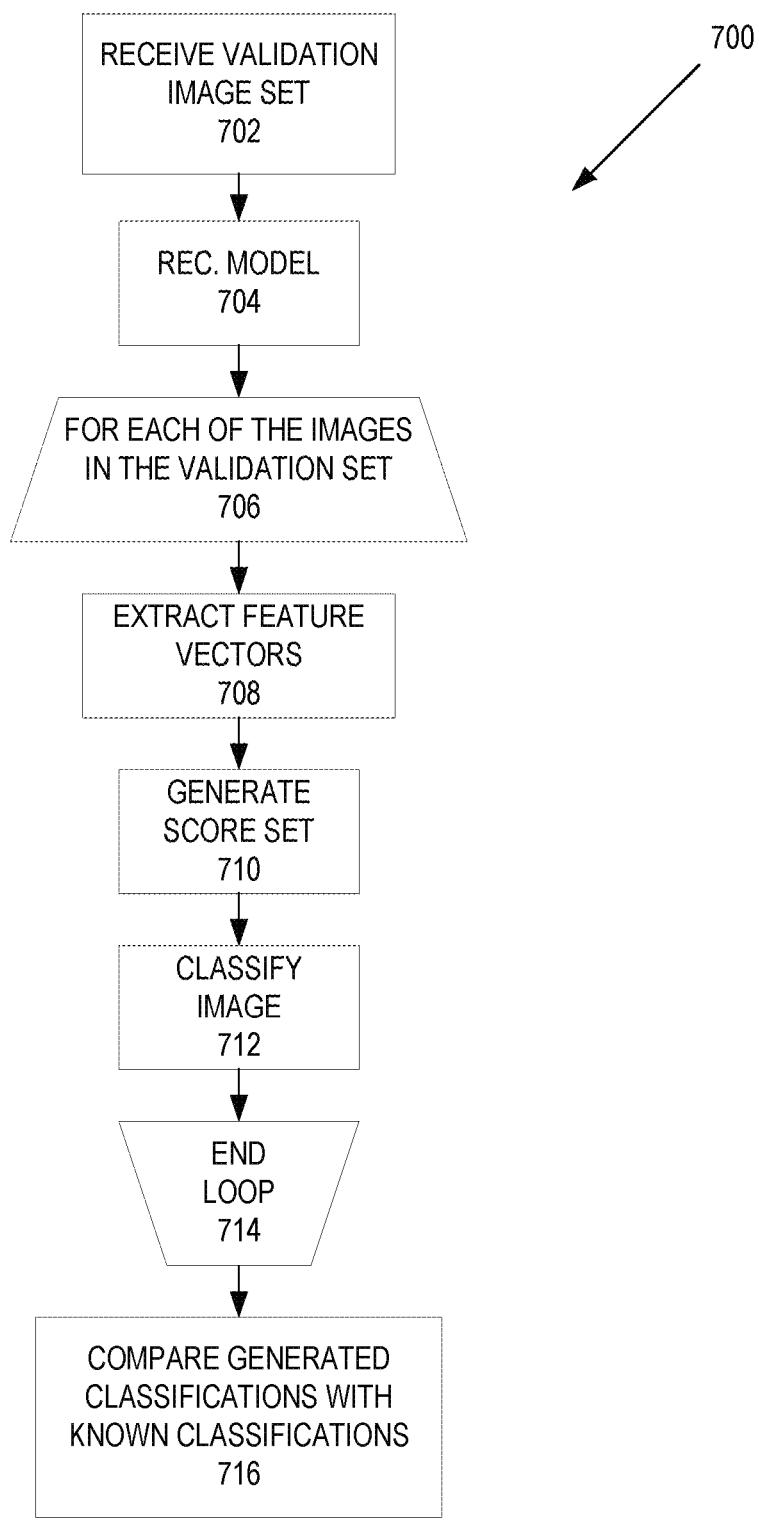
FIG. 7 is a flow diagram of one embodiment of a process to validate a classification model.

In FIG. 6, process 600 trained a classification model that is used to classify images. How good the classification model can be checked by validating the classification model using the training set of images as inputs and computing one or more labels. FIG. 7 is a flow diagram of one embodiment of a process to validate a classification model. In FIG. 7, process 700 begins by receiving a validation image set at block 702. In one embodiment, the validation image set is the same as the training set. In another embodiment, the validation set can be different from the training image set. For example and in embodiment, an image set that has been labeled for a particular type of image (e.g., histopathology of a certain disease) can have some image selected for use in training the models and other images from this set be used for validating the trained models. At block 704, process 700 receives the models used for classifying the validation image sets. In one embodiment, the model is a classification model, such as an MLP model and/or other model(s) described elsewhere.

Process 700 performs a processing loop (blocks 706-714) to generate a set of image labels for the validation image set. At block 708, process 700 extracts the feature vectors for an image in the validation image set. In one embodiment, process 700 extracts the feature vector as described in FIG. 3 above. For example and in one embodiment, process 700 uses a ResNet-50 convolutional neural network to determine the feature vector for each tile of a tiled segment image as described in FIG. 3 above. In one embodiment, process generates a set of feature vectors for the validation image set. Process 700 generates a score set for the validation image set using the set of feature vectors at block 710. In one embodiment, process 700 generates the score set for the image by using convolutional 1D layer to create a score for each tile as described in FIG. 4 above. In this embodiment, process 700 selects a subset of tiles for the image, where this subset of tiles is used to generate the tiles scores. Furthermore, process 700 classifies each of the images using the trained classification model at block 712. In one embodiment, process 700 uses a multi-layer perceptron (MLP) with two fully connected layers of 200 and 100 neurons with sigmoid activation to classify the images in the validation image set. The process loop ends at 716.

With the classifications for the validation image set, process 700 can compare the generated classifications with the known classifications of images in the validation image set to determine the accuracy of the model(s) used for this type of image set. In one embodiment, any type of metric that compares differences or distances between labels can be used. For example and in one embodiment, process 700 can use the area under the receiver operating characteristic curve (ROC-AUC) to determine a comparison between the generated classifications and the known classifications of images in the validation image set when the prediction task is a binary task. In another embodiment, process 700 can use the area under the precision recall curve (PR-AUC) to determine a comparison between the generated classifications and the known classifications of images in the validation image set when the binary labels are unbalanced. In another embodiment, when predicting survival, process 700 can use the concordance index (c-index) to determine a comparison between the predicted risk ordering of the data points and the known ordering.

Figure 8:
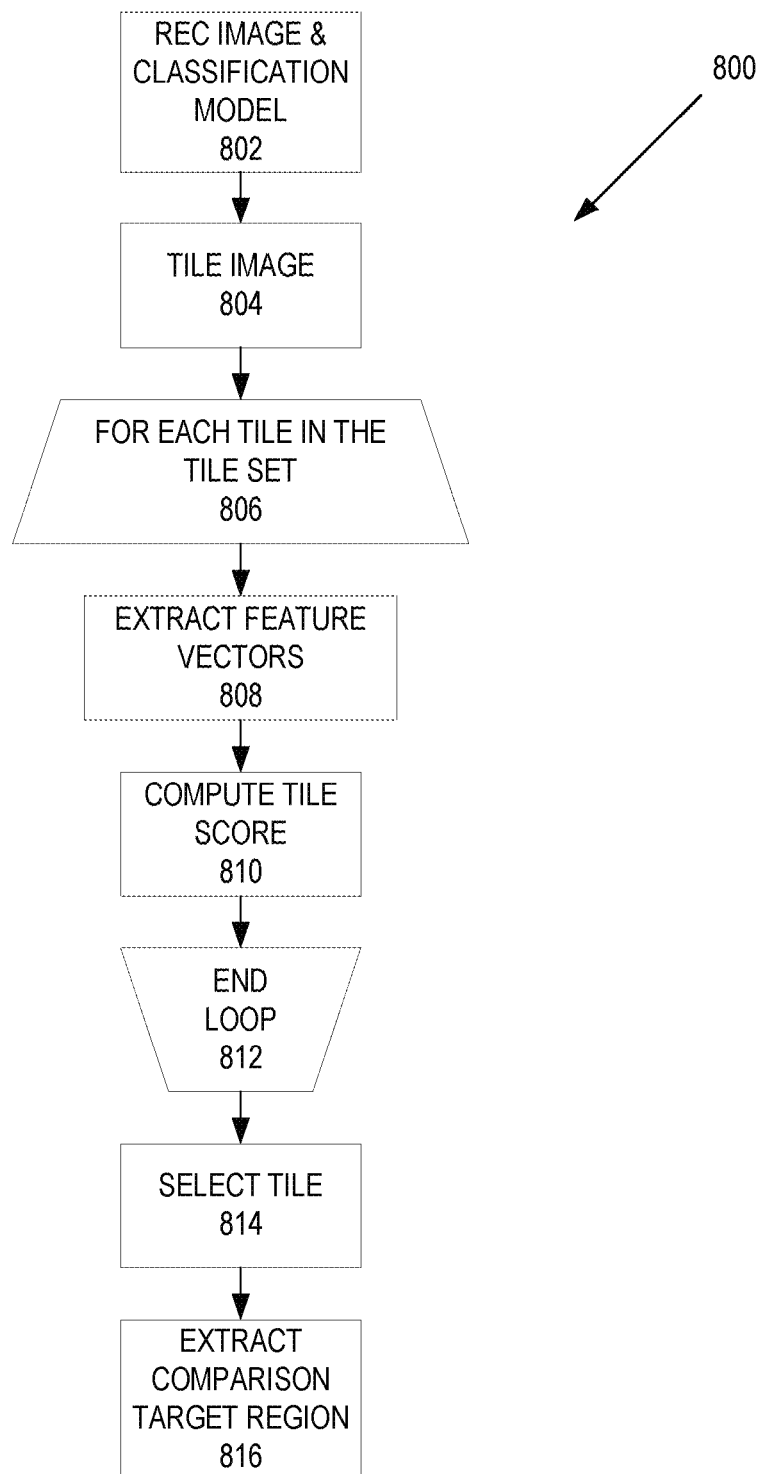
FIG. 8 is a flow diagram of one embodiment of a process to extract a comparison target region from an image.

In addition to predicting a label for an image as described in FIG. 1 above, the preprocessing device 102 and/or classifying device 108 can further extract a comparison target region for an image based on the tile scores for that image. In this embodiment, the comparison target region is different from the region of interest as described in FIG. 3 because there can be tiles that are similar (e.g., visually similar) to one or more of the tiles with the minimum or maximum scores. For example and in one embodiment, the comparison target region tiles can be tiles with average scores (e.g., scores that are not the minimum or maximum scores for the computed tile scores of that image) and that resembles tiles from the maximum or minimum scored tiles. FIG. 8 is a flow diagram of one embodiment of a process 800 to extract a comparison target region from an image. In FIG. 8, process 800 begins by receiving the image and the model(s) at block 802. In one embodiment, the image is an image that can be classified by the model(s) (e.g., histopathology image, satellite image, etc.) and the model(s) are used to select a comparison target region. In this embodiment, the models can include models used to segment the image, extract feature vectors, and/or score the feature vectors as described in FIG. 3 above. At block 804, process 800 segments the image. In one embodiment, process 800 segments the image as described in FIG. 3, block 304. Process 800 tiles the image at block 806. In one embodiment, process 800 tiles the image as described in FIG. 3, block 306. At block 808, process 800 extracts the feature vectors for the image. In one embodiment, process 800 extracts a feature vector for each of the image tiles as described in FIG. 3, block 308. Process 800 scores the image tiles using the extracted feature vectors at block 810. In one embodiment, process 800 scores the image tiles as described in FIG. 3, block 310. The processing loop ends at block 812

At block 814, process 800 selects an image tile using at least the tile score. In one embodiment, this tile is used to determine the comparison target region. In one embodiment, process 800 select the tile based on at least the tile score and a rank of the tile score. In this embodiment, process 800 can select the top number ($R_{top}$) number and/or a bottom number ($R_{bottom}$) of scores. In one embodiment, $R_{top}$ and $R_{bottom}$ represent the highest and lowest tiles scores. In one embodiment, the ranges of values for $R_{top}$ and/or $R_{bottom}$ can be the same or different. In addition, the $R_{top}$ and/or $R_{bottom}$ ranges can be a static numerical range (e.g., 10, 20, 100, or some other number), adapted to a range, a percentage, a label (e.g., small, large, or some other label), set via a user interface component (slider, user input, and/or another type of user interface component), and/or some other value. Alternatively, process 800 can select a set of one or more tiles that are either above a first threshold of a tile scores or below a second threshold tile score, where the first threshold can be the same or different. In a further embodiment, process 800 randomly selects one or more tiles based on at least a probability derived from at least a corresponding tile score, In this embodiment, using a random selection based on a probability derived from at least a corresponding tile score allows for the selection of tiles with outlying tile scores means that there is a higher probability of selecting tiles with higher or lower scores, instead of strictly selecting tiles with the top N or bottom N tile scores.

Process 800 extracts a comparison target region at block 816. In one embodiment, process 800 uses the selected tile(s) from block 814 above to extract the comparison target region associated with the selected tile(s) having an average score and in visual proximity with at least one of the selected tiles according to a distance metric. For example and in one embodiment, the distance metric process 800 uses to evaluate the visual proximity between two tiles can be a L2 norm computed on the extracted features of the two tiles and/or a L2 norm computed on those two tiles.

As described above, the models used for classification and tile selection do not require or use local annotations of the images made by a specialist (e.g., a pathologist). In another embodiment, if there are local annotations present in the image, these local annotations can be used to improve the predictive use of the model(s). Thus, in one embodiment, when local annotations are available, such as the presence of tumors in regions of the slides, a hybrid technique can be used to take those annotations into account. To do so, a device can train the machine learning model for two concurrent tasks: (1) the local prediction of the presence of macroscopic properties on each tile (e.g., presence of tumors or other types of macroscopic properties) and the prediction of a set of global labels. A complex architecture can be used by the device (or multiple devices) that involves, on one side, the classification system described above in FIG. 3 to process a set of 128 features. On the other side, the device applies a convolutional neural network to transform the features of the N tiles into an N*128 features vector. Based on this vector, the device trains a convolutional neural network to predict, for each tile, the local annotation information such as the presence or absence of tumor. The device can take both the output of the prediction and the N*128 features vector and apply an operation of weighted pooling on the concatenation of those two vectors to get a 128 features vector for the input image. The device concatenates the classification model's output and the 128 features obtained and try to predict based on this vector, a set of global labels for that image (e.g., survival, tumor size, necrosis, and/or other types of predictions). The loss of the model involves both global and local predictions. In this embodiment, by adding information derived from the local annotations into the computational flow, the performance of the overall model can be increased.

Figure 9:
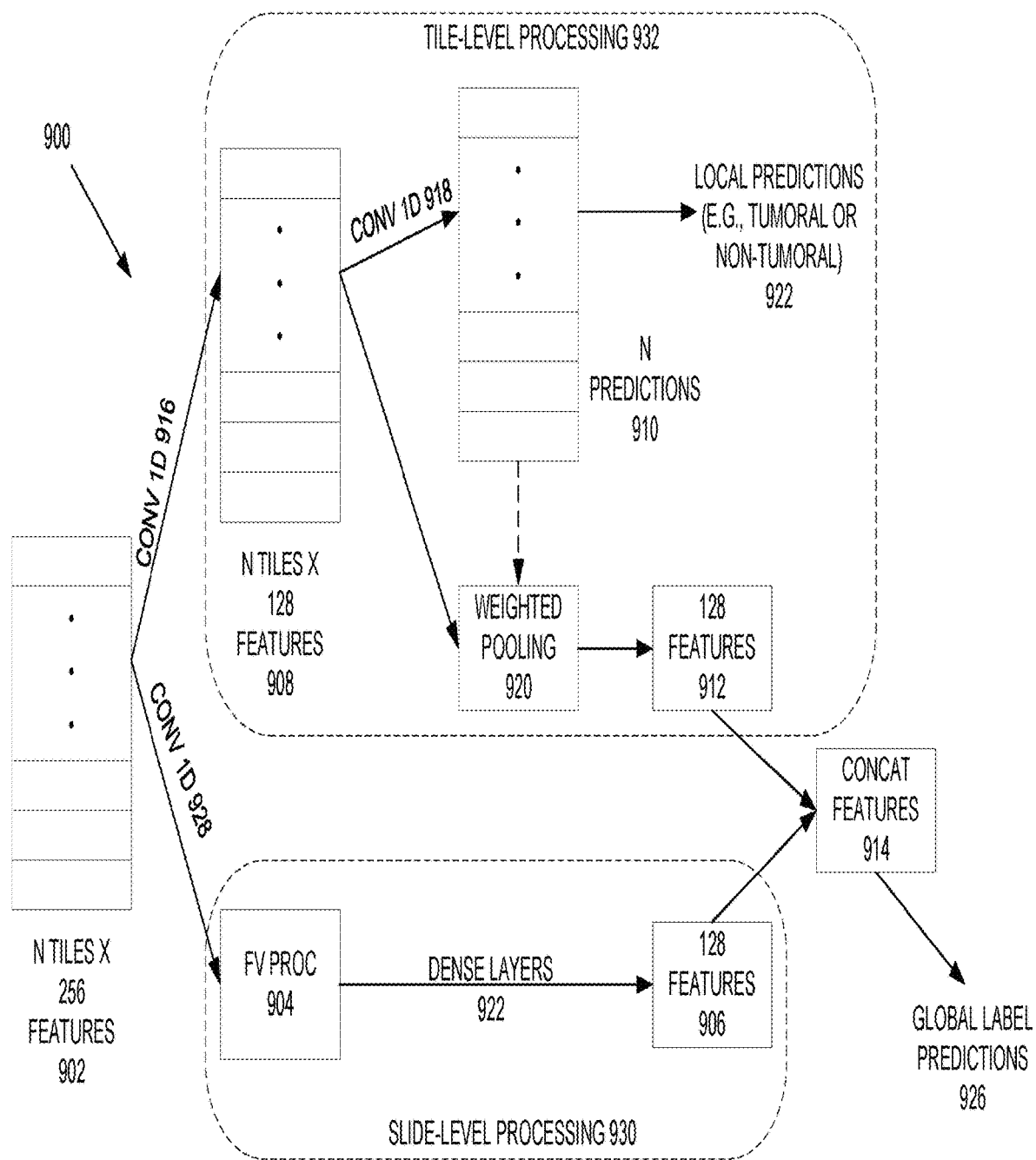
FIG. 9 is a block diagram of one embodiment of a system for classifying an image using a classification model and local annotations.

FIG. 9 is a block diagram of one embodiment of a system 900 for classifying an image using a classification model and local annotations. In FIG. 9, the system 900 can use both a slide-level processing 932 and a tile-level processing 930. In one embodiment, the tile-level processing 932 processes the tiles using the local annotations to improve the global label predictions of the overall system 900. In one embodiment, the tile-level processing 932 processes the tiles and feature vectors as described in FIG. 3 above. Furthermore, the results of each of the slide-level processing 930 and the tile-level processing 932 can be combined and further processed to determine various predictions that will be described below.

In one embodiment, the system 900 receives an image with a set of N tiles and corresponding set of feature vectors that is derived from an input image using a tiling and feature vector generation operation. For example and in one embodiment, the system 900 receives a tiled image and corresponding set of feature vectors that is generated as described in FIG. 3 above. While in one embodiment, system 900 receives N tiles with a set of feature vectors of 256 features for each feature vector, in an alternative embodiment, the set of feature vectors can include feature vectors with a smaller or greater number of features. The system 900 further sends the set of feature vectors to the slide-level 930 and tile-level 932 processing. In this embodiment, each of the feature vectors for the tile-level processing 932 are reduced from 256 features to 128 features. In one embodiment, the feature vectors are reduced by using a one dimensional convolutional neural network 916. In this embodiment, this one dimensional convolutional neural network 916 is used to extract the interesting features for each tile. The one dimensional convolutional neural network 916 can be applied once, multiple times, or none at all. While in one embodiment, the number of features per feature vector is reduced by one half, in alternate embodiments, the number of features vector can remain the same, decrease by a different amount, and/or increase. In a further embodiment, the system 900 sends the set of feature vectors to the slide-level processing 930 after applying a one dimensional convolutional neural network 928 is used to extract the interesting features for each tile).

In one embodiment, the tile-level processing 932 begins by receiving the set of feature vectors 908 that is generated by the one dimensional convolutional neural network 916 described above. The tile-level processing 932 further trains a second one dimensional convolutional neural network to the set of feature vectors 908 using the local annotations. In this embodiment, a second one dimensional convolutional neural network can then be used to predict the presence of macroscopic features 910 in each of the tiles for an input image that does not include any local annotations (e.g., the presence or not of tumors in each tile, the presence of other macroscopic medical features (e.g., inflammation, etc.), and/or the presence of other types of features). If there are local annotations for some or all of the tiles, the N predictions can be supplemented or replaced with predictions derived from the available local annotations. For example and in one embodiment, if a pathologist determines a partial or full outline or identification of a tumor on the image, the N predictions for the corresponding N tiles can be derived from the indication or absence of tumors for each image tile. If there are no local annotations, this trained one dimensional convolutional neural network can be used to create the N predictions. These N predictions 910 can be combined with the convolved features vector set 908 to create a new feature vector 912 by a weighted polling of the N predictions and the convolved features vector set 908. In one embodiment, the new feature vector 912 is 128 features. In this embodiment, the weighted pooling is used to weight the feature vector set 908 with the N predictions 910. In an alternative embodiment, the new feature vector 912 can have more or less numbers of features.

Concurrently, the slide-level processing 930 receives the original feature vector set 902 and performs the feature vector processing as described in FIG. 3 above using dense layers 922 to generate a feature set 906. While in one embodiment, the feature vector set 906 is 128 features, in alternate embodiments, the feature vector set 906 can include more or less numbers of features.

In one embodiment, with the feature vector 912 generated by the tile-level processing 930 and the feature vector 906 generated by the slide-level processing 930, the system has two different feature vectors. The system can additionally combine these feature vectors by concatenating the two feature vectors into a resulting feature vector 914, where the resulting feature vector 914 can be used to predict one or more global labels 928. For example and in one embodiment, one or more global labels can be predicted for medical image slide, such as survival or disease-free survival, clinical data, tumor size, vascular invasion, necrosis, and/or other types of predictions. In one embodiment, by using the feature vectors from both the slide-level processing 930 and the tile-level processing 932, the resulting feature vector 914 can have an influence from the local annotations, which then can be used for predictions.

Figure 10:
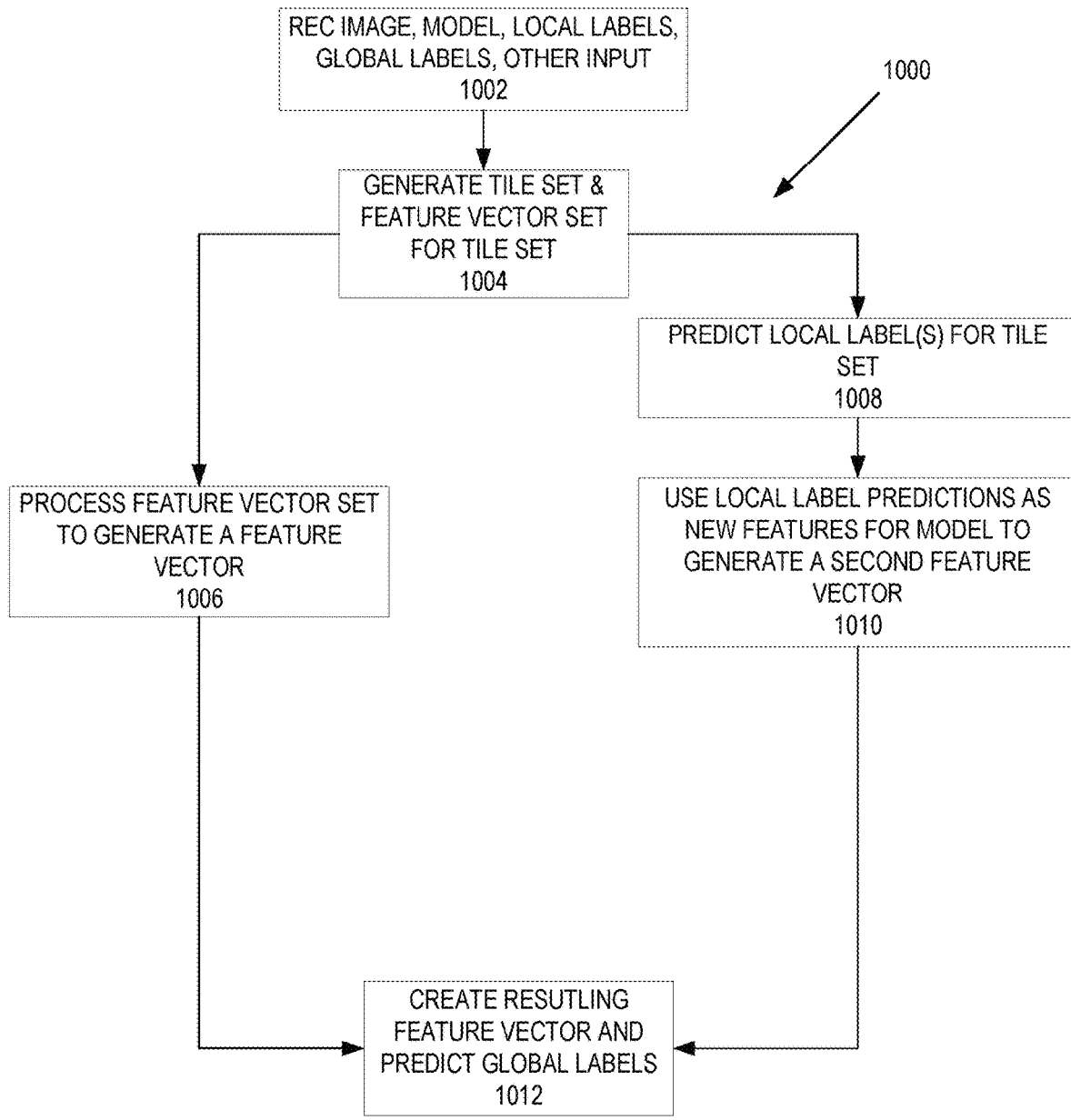
FIG. 10 is a flow diagram of one embodiment of a process to classify an image using a classification model and local annotations.

As per above, the system 900 can use local annotations, if available, to further improve the predictive abilities of the classification model(s). FIG. 10 is a flow diagram of one embodiment of a process 1000 to classify an image using a classification model and local annotations. In FIG. 10, process 1000 begins by receiving the image, the local annotations, and the global label at block 1002. In one embodiment, the local annotations can be data and/or metadata that can describe and/or indicate the presence or lack thereof of macroscopic features in the input image. For example and in one embodiment, the local annotations can indicate certain regions of the image have a tumor or tumor-like tissue. At block 1004, process 1000 tiles the image and generates a set of feature vectors. In one embodiment, process 1000 generates a feature vector for each of the tiles in the image. In this embodiment, each of the feature vectors can include 256 features. For example and in one embodiment, process 1000 tiles and generates the feature vector as described in FIG. 3 above.

At this point, the process 1000 can take two paths for the slide-level and tile-level processing. For the slide-level processing, at block 1006, process 1000 applies the classification model(s) to generate a feature vector of 128 features. In one embodiment, process 1000 applies the classification model(s) to the set of feature vectors as described in FIG. 3, block 308. Execution proceeds to block 1012 below.

Process 1000 performs the tile-level processing starting at block 1008. At block 1008, process 1000 predicts the local label for each of the image tiles. In one embodiment, process 1000 applies a one dimensional convolutional neural network to extract the interesting features of the set of the 256 features vectors. In addition, process 1000 can train a second convolutional neural network using the local annotations to generate a set of predictions for each of the tiles. Process 1000 uses the local predictions as the features for the model at block 1010. At this point, process 1000 has generated a feature vector of 128 features from the tile-level processing of bocks 1008 and 1010. Execution proceeds to block 1012 below.

At block 1012, process 1000 combines the features from blocks 1006 and 1010 to create a resultant feature vector of 256 features. In one embodiment, process 1000 creates the resultant feature vector by concatenating the two feature vectors from blocks 1006 and 1010. Alternatively, the resultant features vector can be created using alternative means. In addition, at block 1012, process 1000 predicts global labels using the resultant feature vector. In one embodiment, process 1000 can predict different global labels, (e.g., for a medical image slide, survival or disease-free survival, clinical data, tumor size, vascular invasion, necrosis, and/or other types of predictions). In one embodiment, process 1000 predicts the global labels by scoring the tiles and creating the predictions as described in FIG. 3, blocks 310 and 312 above.

Figure 11:
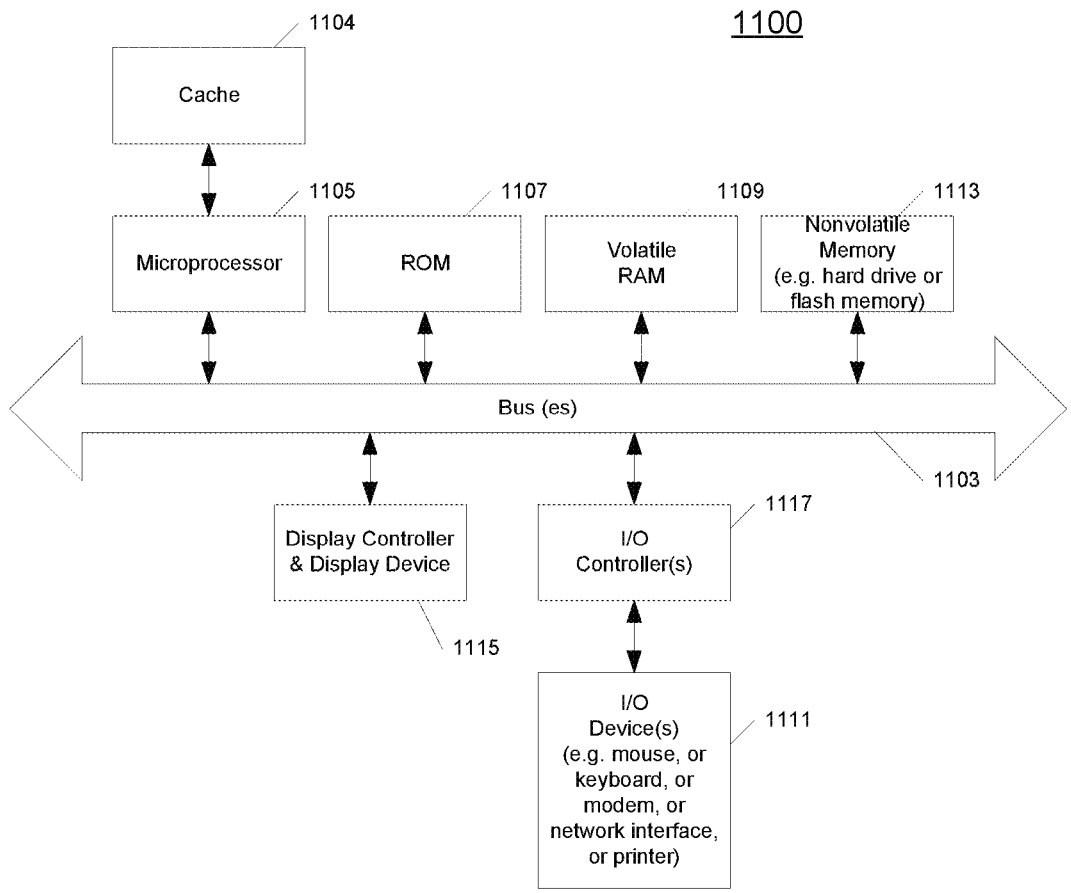
FIG. 11 illustrates one example of a typical computer system, which may be used in conjunction with the embodiments described herein.

FIG. 11 shows one example of a data processing system 1100, which may be used with one embodiment of the present invention. For example, the system 1100 may be implemented including a preprocessing device 102 and/or classifying device 108 as shown in FIG. 1 above. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may include one or more CPU(s), GPU(s), a specialized processor, and/or a combination thereof. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 9111 and to peripheral devices such as input/output (I/O) devices which may be mice, keyboards, modems, network interfaces, printers and other devices which are well known in the art. Typically, the input/output devices 915 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "segmenting," "tiling," "receiving," "computing," "extracting," "processing," "applying," "augmenting," "normalizing," "pre-training," "sorting," "selecting," "aggregating," "sorting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

The invention claimed is:

1. A method of classifying an input image, the method comprising:
   tiling a region of interest of the input image into a set of tiles;
   extracting a first feature vector for the set of tiles by applying a first convolutional neural network, wherein the features of the feature vectors represent local descriptors of the region of interest;
   extracting a second feature vector from the region of interest using a set of local labels generated for the input image;
   combining the first and second feature vectors; and
   processing the combined feature vectors to classify the input image.

2. The method of claim 1, further comprising:
   generating the set of local labels by applying a second convolution neural network to the set of tiles.

3. The method of claim 2, wherein the second convolution neural network is a one-dimensional convolution neural network.

4. The method of claim 1, wherein the classification is a global label for the digital image.

5. The method of claim 1, wherein the extracting a first feature vector comprises:
   extracting a feature vector for each of the tiles in the set of tiles.

6. The method of claim 5, further comprising:
   generating a local label for each of the tiles in the set of tiles.

7. The method of claim 1, wherein the combining of the first and second feature vectors is a weighted pooling of the first feature vector and the second feature vector.

8. The method of claim 1, wherein the combining of the first and second feature vectors is a concatenation of the first feature vector and the second feature vector.

9. The method of claim 1, wherein the input image is a histopathology slide and the classification of the image is a diagnosis classification.

10. The method of claim 1, wherein a classifier is used to classify the input image and the classifier is a multi-layer perceptron classifier, in particular comprising two fully connected layers.

11. A non-transitory computer readable medium with a memory storing code instructions which, when executed by a processor, cause the processor to perform operations for classifying an input image, the operations comprising:
    tiling a region of interest of the input image into a set of tiles;
    extracting a first feature vector for the set of tiles by applying a first convolutional neural network, wherein the features of the feature vectors represent local descriptors of the region of interest;
    extracting a second feature vector from the region of interest using a set of local labels generated for the input image;
    combining the first and second feature vectors; and
    processing the combined feature vectors to classify the input image.

12. The non-transitory computer readable medium of claim 11, further comprising:
    generating the set of local labels by applying a second convolution neural network to the set of tiles.

13. The non-transitory computer readable medium of claim 12, wherein the second convolution neural network is a one-dimensional convolution neural network.

14. The non-transitory computer readable medium of claim 11, wherein the classification is a global label for the digital image.

15. The non-transitory computer readable medium of claim 11, wherein the extracting a first feature vector comprises:
    extracting a feature vector for each of the tiles in the set of tiles.

16. The non-transitory computer readable medium of claim 15, further comprising:
    generating a local label for each of the tiles in the set of tiles.

17. The non-transitory computer readable medium of claim 11, wherein the combining of the first and second feature vectors is a weighted pooling of the first feature vector and the second feature vector.

18. The non-transitory computer readable medium of claim 11, wherein the combining of the first and second feature vectors is a concatenation of the first feature vector and the second feature vector.

19. The non-transitory computer readable medium of claim 11, wherein the input image is a histopathology slide and the classification of the image is a diagnosis classification.

20. The non-transitory computer readable medium of claim 11, wherein a classifier is used to classify the input image and the classifier is a multi-layer perceptron classifier, in particular comprising two fully connected layers.

* * * * *